United States Patent [19]
Bushee

[11] 3,713,462
[45] Jan. 30, 1973

[54] APPARATUS FOR CONTROLLING FLOW OF PRESSURIZED FLUIDS

[76] Inventor: Joseph J. Bushee, 36 Purvis St., Watertown, Mass. 02172

[22] Filed: Dec. 30, 1970

[21] Appl. No.: 102,859

[52] U.S. Cl. ............................................137/625.21
[51] Int. Cl. ..................................................F16k 11/02
[58] Field of Search.......137/625.11, 625.21, 625.22, 137/625.23, 625.24

[56] References Cited

UNITED STATES PATENTS

| | | |
|---|---|---|
| 2,700,984 | 2/1955 | Gleasman........................137/625.11 |
| 3,008,440 | 11/1961 | Angelos...........................137/625.11 |
| 3,190,313 | 6/1965 | Rumsey......................137/625.21 X |
| 3,191,629 | 6/1965 | Stoyke.............................137/625.23 |
| 3,253,616 | 5/1966 | McCorkle et al................137/625.21 |
| 3,494,175 | 2/1970 | Cusick et al.................137/625.11 X |
| 3,554,224 | 1/1971 | Kirk.............................137/625.11 X |

*Primary Examiner*—Henry T. Klinksiek
*Attorney*—Munroe H. Hamilton

[57] ABSTRACT

A valve housing having a fluid inlet is formed internally with an annular spaced defined by space sealing members. Pressurized fluid is introduced through the inlet into the annular space. Portions of the pressurized fluid are continuously confined in a rotor conduit member which sealably communicated with the annular space throughout approximately a 360° path of travel of the movable conduit. The rotor conduit is moved through successive register positions in which pressurized fluid is conducted from the annular space through outlets in a fluid outlet head attached at one side of the valve housing.

10 Claims, 18 Drawing Figures

Inventor:
Joseph J. Bushee,
by Munro H. Hamilton
Attorney

Inventor:
Joseph J. Bushee,
by Munro K. Hamilton
Attorney

PATENTED JAN 30 1973 3,713,462

Inventor:
Joseph J. Bushee,
By Munn H. Hamilton
Attorney

Inventor:
Joseph J. Bushee,
by Munro H. Hamilton
Attorney

APPARATUS FOR CONTROLLING FLOW OF PRESSURIZED FLUIDS

SUMMARY OF THE INVENTION

This invention relates to an improved method and apparatus for controlling flow of a pressurized fluid, and more particularly, the invention is concerned with an improved rotary valve structure. In one desirable embodiment, the invention may be utilized for selectively controlling application of fluid pressure such as a gas pressure in actuating or carrying out various mechanical and electrical operations or other functions especially where such operations or functions are required to be carried out in some desired sequence. In another desirable embodiment the method and apparatus may be employed in controlling flow of liquids.

It is a chief object of the invention, therefore, to provide an improved method and means for controlling flow of a pressurized fluid in connection with selective application of fluid pressure.

Another object is to devise a rotary valve structure which is characterized by novel means for retaining a volume of pressurized fluid and selectively releasing portions of the pressurized fluid through any one of a series of outlet ports.

Another object is to provide a novel selector valve for controlling pressure actuated devices in carrying out a desired sequence of operations.

Still another object of the invention is to devise a valve structure of the character indicated in which a limited number of operating parts are employed to provide a dependable, low-cost unit which can be conveniently made and maintained in operation for long periods of time.

The nature of the invention and its other objects and novel features are further described in connection with the FIGURES in the accompanying drawings.

DESCRIPTION OF THE PREFERRED EMBODIMENTS

Referring more in detail to the drawings, my improved valve construction is in general made up of three principal parts which include a main housing, a fluid outlet head attached at one side of the housing formed with a plurality of fluid outlets and a rotor conduit rotatably received in the housing and provided with a sealing ring which is arranged to revolve in an orbital path of travel into successive sealing positions with respect to each of the fluid outlets.

The valve parts noted are made use of to carry out a novel method of controlling a pressurized fluid wherein a small volume of pressurized fluid is continuously confined in an annular space in the housing. Periodically, pressurized fluid is conducted from the annular space through a rotatable conduit which is arranged to sealably connect with successive outlet passageways as the conduit member is periodically rotated, by means of a revolving sealing ring contained in one side of the conduit in recessed relationship.

Figure 1:
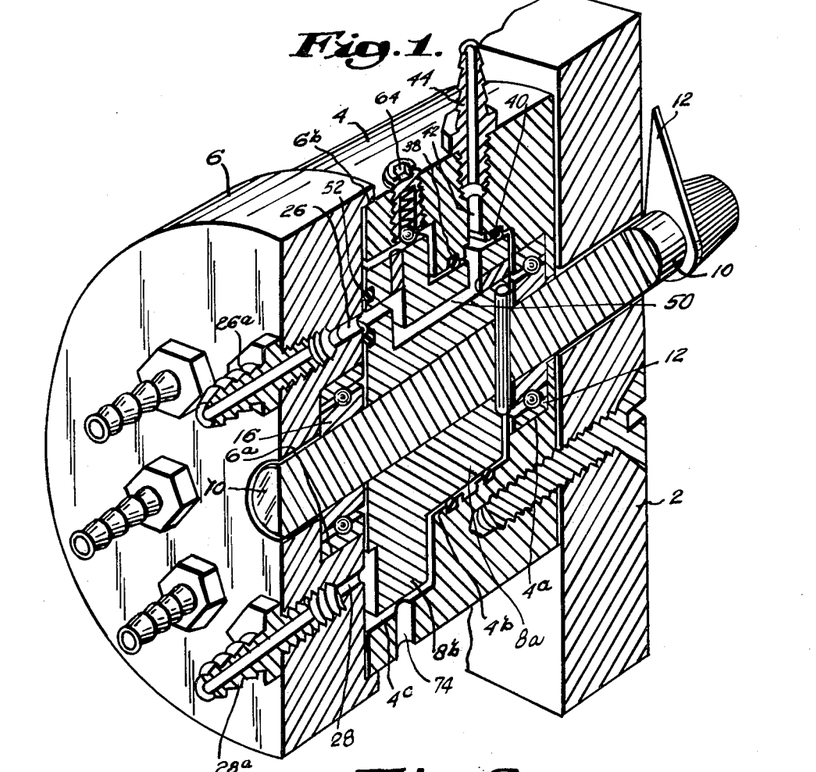
FIG. 1 is a perspective view partly in cross section illustrating the valve structure of the invention.
Figure 2:
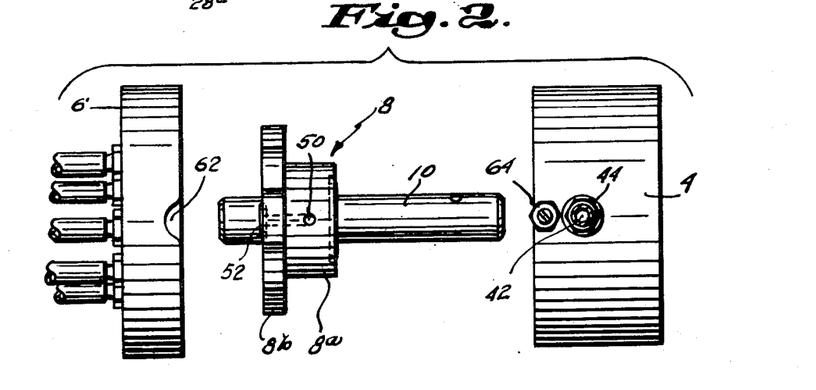
FIG. 2 is an elevational view illustrating the valve components of FIG. 1 shown in separated relationship.

Considering in greater detail the principal parts noted and their operation in carrying out the invention method, attention is directed to FIGS. 1 and 2 which illustrate one simple form of valve construction mounted on a supporting base on panel 2. The arrangement of FIG. 1 is intended to illustrate a manually operated form of the invention to control flow of pressurized fluid from a suitable supply source.

It will be understood that the valve structure of the invention is intended to be utilized either as a means of dispensing measured amounts of fluid such as a liquid, or the valve structure may be used as a means of controlling application of a pressurized fluid such as a compressed gas to operate pressure actuated devices. However, the invention will be described having reference to controlling application of a compressed gas for actuating various pressure-sensitive devices, especially where a number of operations are desired to be carried out in some desired sequence.

As earlier noted, the principal parts of my improved valve structure include a housing body indicated by reference character 4, a fluid outlet head 6 and a rotor conduit member 8. FIG. 2 illustrates these parts in separated relationship and the rotor conduit as shown therein includes a shaft 10 which may carry an arm 12 as shown in FIG. 1 for manually turning the shaft from a point at an outer side of the panel 2.

FIGS. 3 to 9 further illustrate the valve structure shown in FIGS. 1 and 2 together with means for mechanically driving the rotor conduit member. These figures also illustrate the valve structure in combination with pressure actuated devices which are responsive to flow of pressurized fluid through the valve structure.

The rotor conduit includes a keyed shaft and means for periodically turning the shaft through small arcs of rotation.

Figure 8:
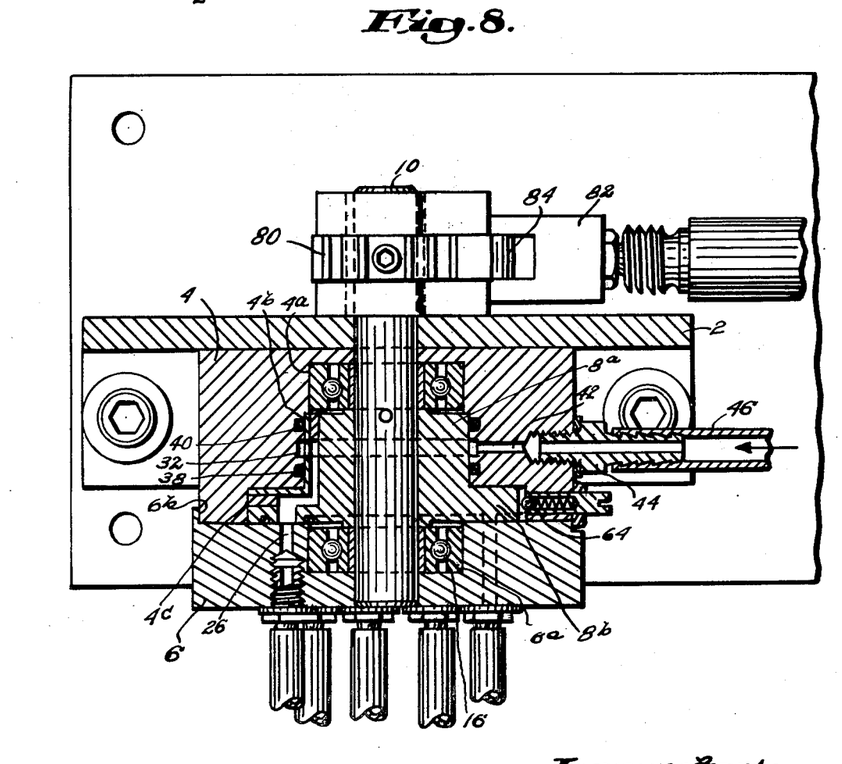
FIG. 8 is a cross section taken on line 8—8 of FIG. 6.
Figure 9:
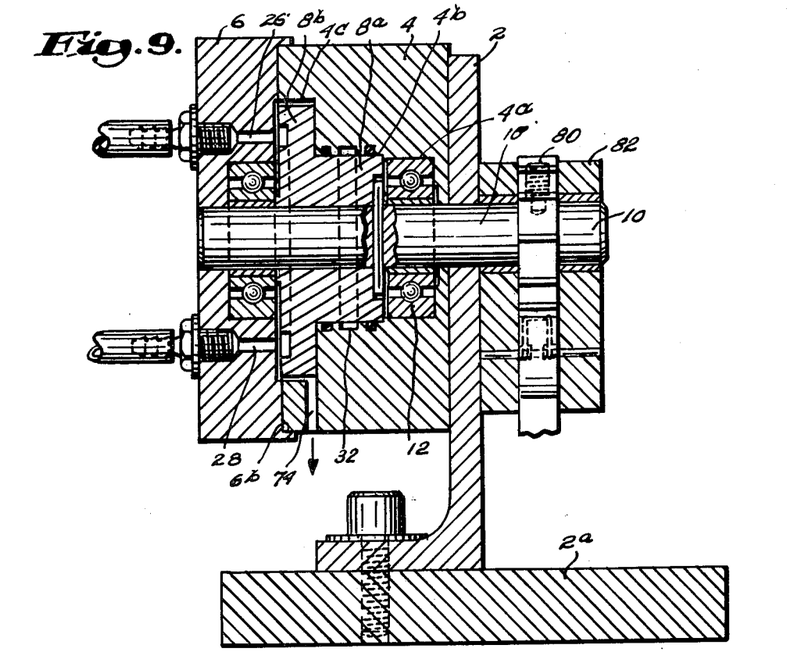
FIG. 9 is a cross section taken on the line 9—9 of FIG. 6.
Figures 13, 14, 15:
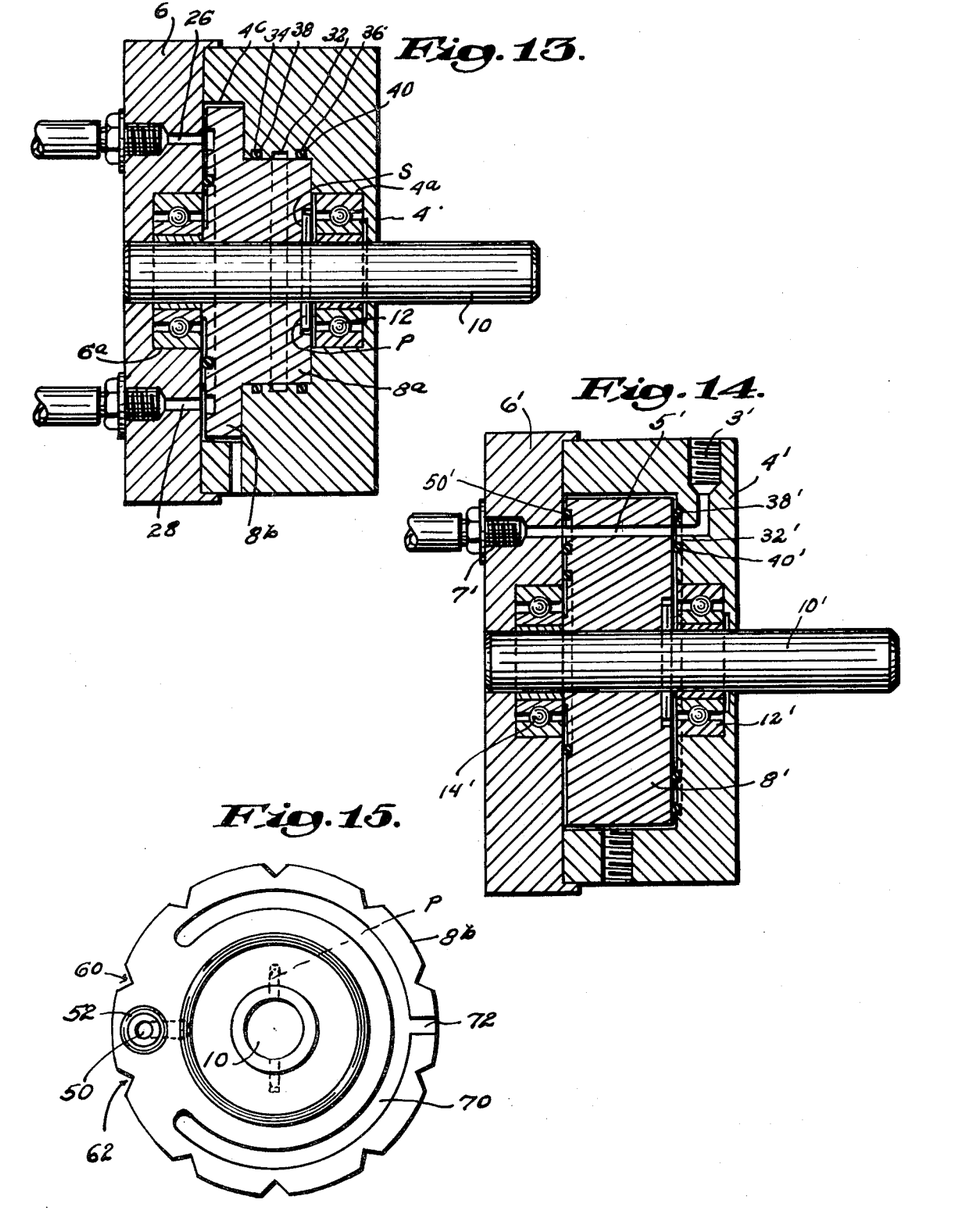
FIG. 13 is a central cross sectional view.
FIG. 14 is a cross sectional view of a modified form of valve.
FIG. 15 is another elevational view of the rotor member.

As shown in FIGS. 1, 9 and 13, the main housing body 4 comprises a cylindrical body which is formed with three concentric bores including an outermost bore 4a, and intermediate bore 4b and an innermost bore 4c. Outermost bore 4a is designed to receive a bearing member 12 in which is rotatably mounted one end of the shaft 10. The bore 4b has located therethrough a cylindrical body portion 8a of the rotor conduit 8, and bore 4c is constructed to enclose a flanged portion 8b of the rotor conduit as shown in FIGS. 1, 8, 9 and 13.

In indicated in these figures, the outlet head 6 is formed with two concentric bores including an inner bore 6a in which is received a bearing 16 (FIG. 10) and an outer bore 6b within which is snugly fitted one end of the housing 4, as shown in FIGS. 8 and 9. The bearing 16 rotatably supports the opposite end of shaft 10 and an intermediate portion of the shaft is fixed to the rotor by means of a pin P (FIG. 13) transversely disposed through the shaft and retained in a radially extending slot S in the end face of the rotor conduit.

Figure 5:
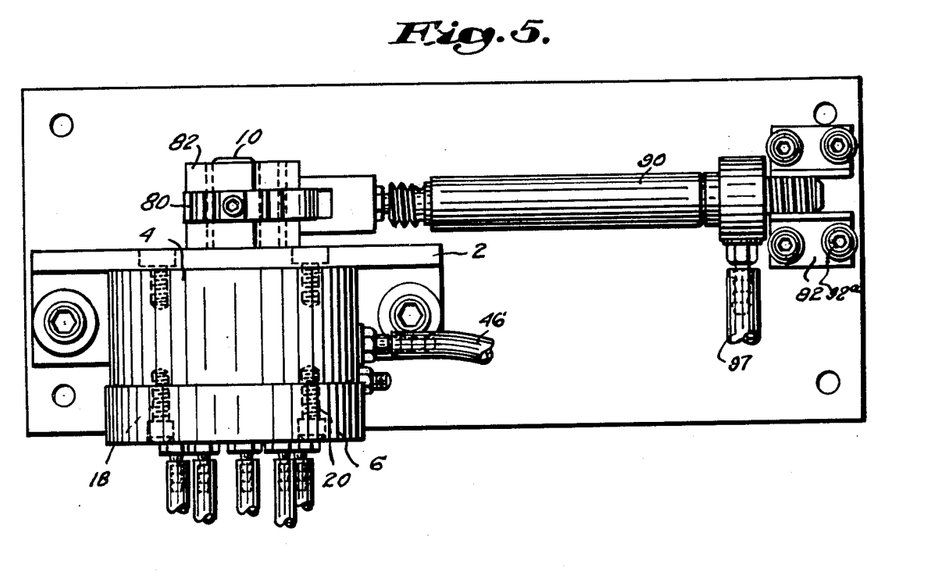
FIG. 5 is a plan view illustrating the valve structure combined with driving mechanism for moving the valve rotor through successive operating positions.
Figure 6:
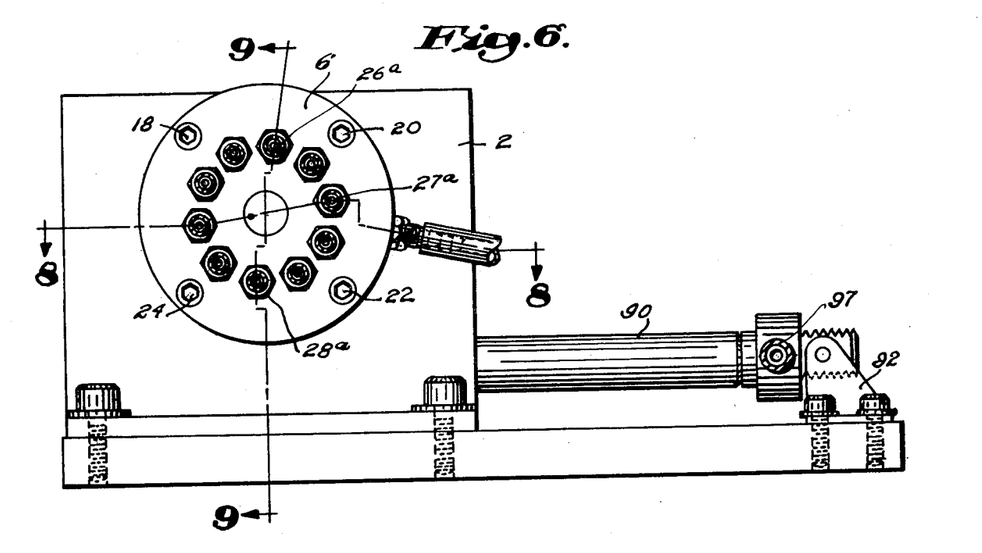
FIG. 6 is a side elevational view of the structure shown in FIG. 5.

The outlet head 6 is solidly secured against the housing 4 by suitable fastening means such as bolts 18, 20, 22 and 24 which are located through holes 18a, 20a, 22a, and 24a. The bolts engage in correspondingly threaded openings in the housing as indicated in FIG. 5 to solidly lock these parts together. Also located through the outlet head 6 are circumferentially spaced apart outlet passageways 26, 27, 28 etc. arranged as shown, for example, in FIG. 10, and communicating with these outlet passageways are tubular fittings as 26a, 27a, 28a, etc. in threaded engagement with threaded openings in the outlet head.

In accordance with the method of the invention, the valve components described are employed to continuously confine an annular volume of pressurized fluid in the housing and to conduct pressurized fluid from the annular volume through the rotor conduit and out of spaced outlets in the outlet head in a highly selective manner. In carrying out this method of controlling flow of pressurized fluid, the housing 4 and rotor conduit 8 are specially structured with fluid conducting means and an important feature of the invention is the provision in the housing of an annular space into which a volume of pressurized fluid may be introduced and confined, and more importantly, from which pressurized fluid may be periodically removed through the rotor conduit at any point in a relatively large arc of rotation of the rotor conduit approaching, or even including, a full 360° arc of travel. In combination with the annular space, I further mount spaced sealing ring members at either side thereof. These sealing rings are arranged to sealably engage an apertured cylindrical sealing body constituting a part of the rotor conduit. Peripheral surface portions of the cylindrical sealing body lying between the sealing rings cooperate with the annular space to sealably contain a small volume of pressurized fluid at all times while the valve is in operation, and to selectively remove pressurized fluid at predetermined points.

Considering the structure and relationship of parts noted in further detail, attention is directed to FIG. 13 wherein the housing 4 is shown on a somewhat enlarged scale, and wherein the housing is formed with an annularly recessed surface 32. At either side of the recessed side 32 are also formed ring grooves 34 and 36 in which are supported sealing ring members 38 and 40.

The annular recessed surface 32 and the sealing rings 38 and 40 are further shown in FIG. 8 and as indicated in this FIGURE, I provide in the housing 4 an inlet opening 42 which extends from an outer peripheral surface of the housing radially inwardly through the housing wall to intersect the annular surface 32 at one point. An inlet fitting 44 is threaded into an enlarged threaded end of the inlet opening 42 and is designed to be connected by a tubular member 46 to a source of compressed fluid such as compressed air. The sealing rings 38 and 40 as well as the inlet opening 42 are also shown in more detail in FIG. 1.

In combination with the sealing rings and recessed annular space described, I also provide the cylindrical body portion 8a of rotor conduit 8 with a diameter such that the peripheral surface of cylindrical body 8a sealably engages inside of the sealing rings 38 and 40, as shown in FIG. 8, for example. The cylindrical body 8a is also made of an axial length to lie in snugly abutting relation to an adjacent end of the housing 4 so that when the rotor conduit is received within the housing, it is held in place by the bolted outlet head.

By means of this arrangement, the peripheral surface area of the cylindrical body 8a lying between the sealing rings 38 and 40 is constantly maintained in spaced relation to the recessed annular surface 32 of the housing 4 and there is thus defined an annular chamber in which a small volume of compressed fluid introduced through the fluid inlet 42 may be continuously confined, especially during rotative movement of the rotor conduit member.

Communicating with this annular chamber is another passageway 50 especially formed in member 8a (FIG. 2). This passageway 50 extends from a point in the peripheral surface of the cylindrical body 8a lying between the sealing rings 38 and 40 radially inwardly for a short distance, then axially for another distance, then radially outwardly through the flange portion 8b of the rotor conduit, and finally exiting at an end face of the flanged portion 8b, as shown more clearly in FIGS. 11 and 15. Located around the exit end of the passageway 50 is a small sealing ring member 52 which is supported in an annular recess formed in 8b, as shown, and which is of a size chosen to extend in spaced relation around any one of the openings 26, 27, 28, etc. in the outlet head. The passageway 50 described is most clearly shown in FIG. 1, and it will be understood that the sealing ring 52, while compressibly engaged against an inner side of the outlet head, revolves with the flange portion 8b in an orbital path of travel to successively overlie and encircle each of the outlet passageways 26, 27, 28, etc.

I also provide detent means for releasably holding the flange 8b and the sealing ring 52 in sealing relationship with any one of the openings 26, 27 and 28. As shown in FIG. 15, the flange 8b has its outer peripheral edge formed at spaced apart points with notches as 60, 62, etc. and arranged to yieldably engage in these notches is a spring-loaded detent ball assembly 64 supported through one side of the housing 4, as is most clearly shown in FIGS. 1, 2 and 8. This ball assembly is located in a position to lightly engage in any one of the notches 60, 62, etc.

It is pointed out that the housing 4 and outlet head 6 may be secured together so that the detent ball assembly may be oriented with the outlet openings in the outlet head as by means of the indentation 62 in the outlet head (FIG. 2). It will also be observed that the notches 60, 62, etc, in the flange 8b, are preferably placed at either side of the sealing ring 52 in a position such that the sealing ring will always be in register with an outlet opening when the ball assembly is in a holding position.

Figures 10, 11:
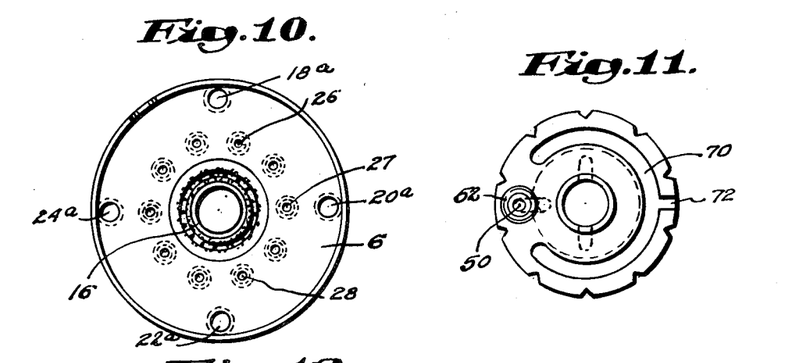
FIG. 10 is a detail elevational view of the outlet head component of the valve.
FIG. 11 is an end elevational view of the rotor conduit component of the valve structure.
Figure 12:
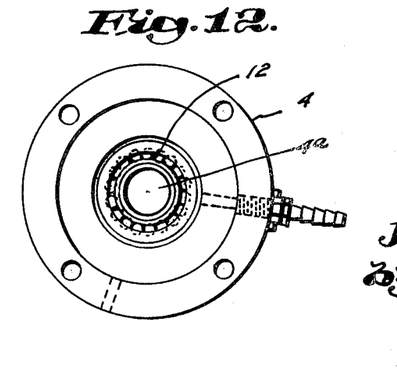
FIG. 12 is an end elevational view of the housing component of the valve.

Extending away from the sealing ring 52 in a circular direction as shown in FIGS. 11 and 15, is a shallow groove 70 formed in the end face of the flange as indicated, and leading away from this groove 70 is a radially extending slot 72 which is in communication with a fluid exhaust port 74 in housing 4, as is more clearly illustrated in FIG. 9 and hereinafter referred to in more detail.

Figure 7:
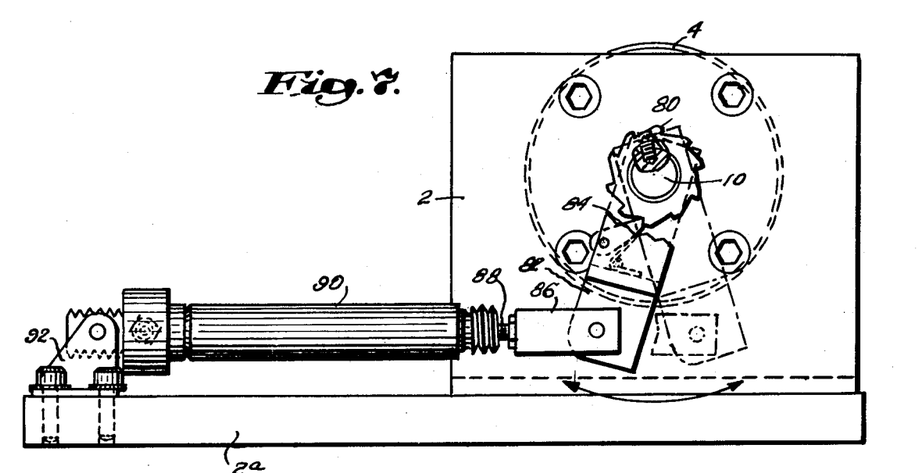
FIG. 7 is another elevational view of the structure shown in FIGS. 5 and 6.

In applying the ball assembly 64 to the notches 60, 62, etc. indexing movement of the shaft 10 and the notched flange 8b to which it is pinned, may be accomplished either by manual operation of the arm 12 shown in FIG. 1, or by suitable mechanical means as earlier noted. FIGS. 3, 5, 7, 8 and 9 illustrate one simple form of mechanical indexing means for the shaft 10 and the notched flange 8b. Included therein is a ratchet wheel 80 fixed on the shaft 10 as shown in FIG. 8. The ratchet wheel is enclosed in a yoke 82 which has the shaft rotatably received through its two sides. At the inner end of yoke 82 is a spring-loaded pawl 84 pivotally arranged to engage a ratchet tooth and rotate the shaft 10 when the yoke is actuated through a clevis 86 secured at one end of a plunger 88 in a fluid pressure-actuated cylinder 90. Cylinder 90 is pivotally mounted in brackets 92 secured to a suitable extension 2a of the panel 2, as shown in FIG. 7. Compressed fluid such as air is supplied through a conduit 97 to cylinder 90 and introduction of compressed air may be carried out in timed relationship, for example, by means of a timing clock 96 (FIG. 3) which operates a solenoid valve 98, in a compressed air line 98a. Various other power driving means for shaft 10 may be employed in ways well-known to those skilled in the art.

Figure 3:
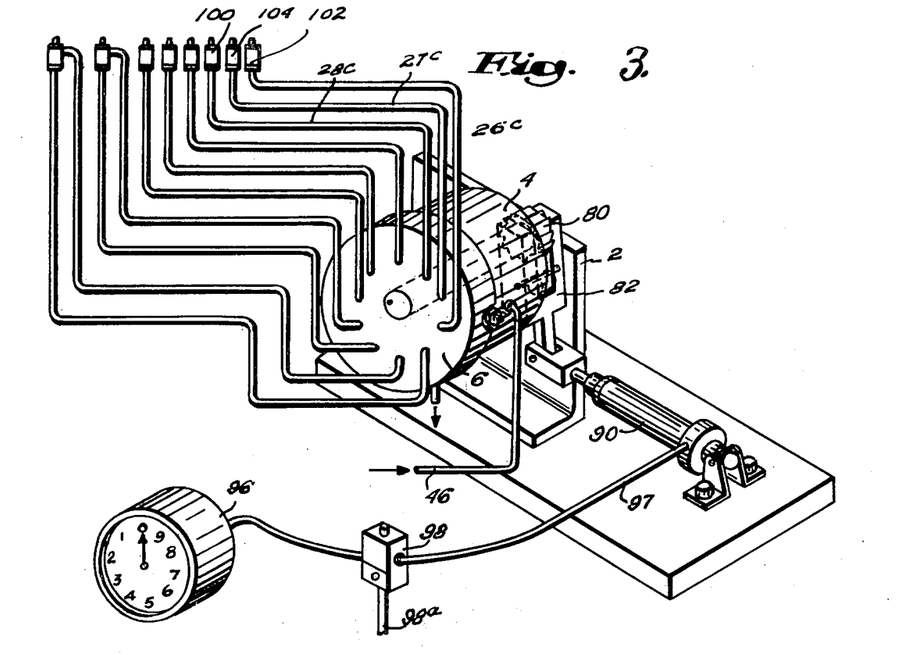
FIG. 3 is an elevational view illustrating the valve structure combined with a pressure actuated device to be controlled by operation of the valve structure.

In FIG. 3, I have illustrated the valve structure described combined with pressure-actuated cylinders arranged in some desired relationship suitable for carrying out a series of operations in a required sequence. As indicated in FIG. 3, the outlet fittings 26a, 27a, 28a, etc. are provided with tubular conduits 26c, 27c, 28c, etc. which connect with cylinders as 102, 104, 106, etc. One of the cylinders, 102, is shown in more detail in FIG. 16.

Figures 16, 17:
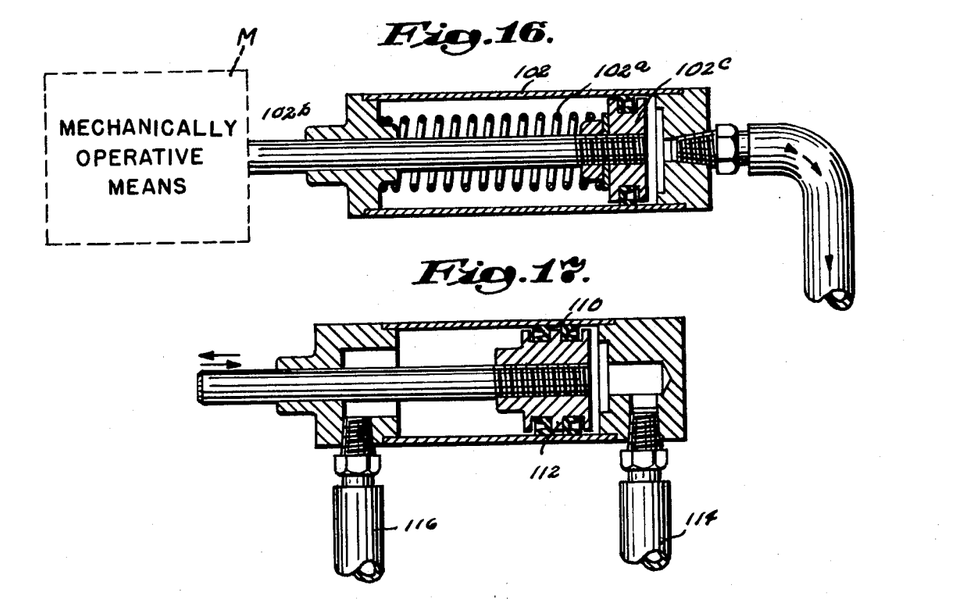
FIG. 16 is a diagrammatic view of a pressure actuated device.
FIG. 17 is a diagrammatic view of another pressure actuated device.

In operating the cylinder 102, it may be assumed that a pressurized fluid such as compressed air, at a pressure of from 30 to 40 p.s.i., has been introduced through a fluid inlet port 44 and is being maintained in the annular space lying between the recessed surface 32 of the housing and an adjacent peripheral surface of the cylinder body portion 8a. Pressurized fluid is also retained in the passageways of the rotor conduit 8 and is held by reason of the sealing engagement of the sealing ring 52 against a surface of the outlet head 6 occurring between the outlet openings 26, 27, 28, etc.

At a predetermined point, the timer 96 operates the solenoid valve 98 and flow of compressed air from source 98a into cylinder 90 causes the ratchet mechanism to turn shaft 10 and rotor conduit 8 through a small arc of rotation. The rotary movement advances the sealing ring 52 in the rotor flange into sealing relation around an outlet opening as 26 in the outlet head, and pressurized fluid operates through the tubular member 26c to activate the plunger of cylinder 102.

As shown in FIG. 16, the plunger 102c of the single-acting cylinder working against the resistance of the spring 102a, advances the rod 102b to carry out a desired mechanical operation at M. At the end of a short interval or dwell period, the timer 96 again operates and the rotor conduit advances into sealing relationship with a next outlet in the outlet head. When this occurs, the pressurized fluid in cylinder 102 is ejected by plunger 102b in response to the action of spring 102a. Compressed fluid thus ejected returns through member 21c and outlet opening 26. In this position of the rotor conduit, the outlet 26 communicates with the circular groove 70 and return fluid passes along this groove out of slot 72 and is then exhausted out through the exhaust opening 74 in the housing 4.

It will be apparent that the method and apparatus of the invention may be employed for controlling a wide range of functions and other types of cylinders or other pressure-sensitive actuating means may be employed. For example, as shown at the left hand side of FIG. 3, I may desire to control flow of fluid into one end of a cylinder from one outlet port and return air through another outlet port which communicates with the exhaust opening 74, earlier noted. FIG. 17 illustrates a cylinder 110 in which the plunger 112 is actuated in one direction by flow of fluid from the valve through a tubular member 114, and movement of the plunger 112 is reversed by flow of fluid through the tubular member 116.

Figure 4:
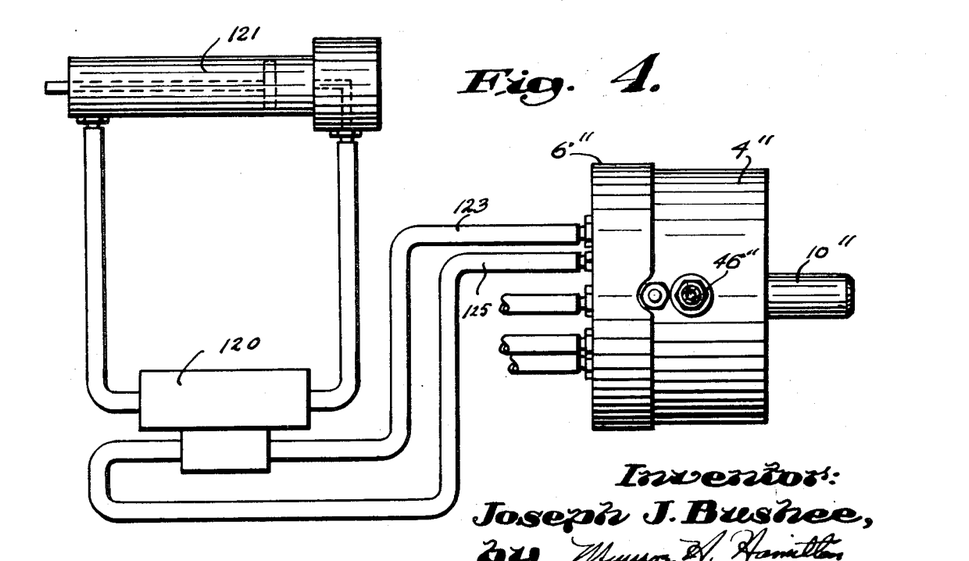
FIG. 4 is an elevational view similar to FIG. 3 illustrating another form of pressure actuated device with which the valve structure may be combined.

It may also be desired to use a cylinder arrangement for carrying out more specific functions such as maintaining a plunger in a holding position, and FIG. 4 is illustrative of such an arrangement, using a four-way valve 120 and cylinder 121 of well-known type connected to conduits 123 and 125 of an outlet head 6'' supporting a housing 4'' and a shaft 10'' in which a rotor conduit of the class described is contained.

Figure 18:
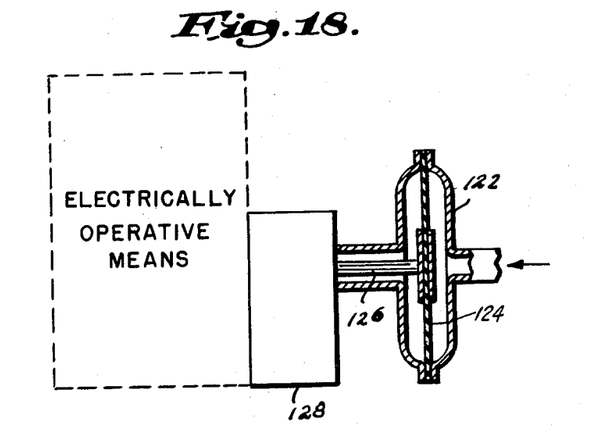
FIG. 18 is a diagrammatic view of still another pressure responsive device.

FIG. 18 is intended to illustrate diagrammatically application of a controlled flow of fluid from the valve of the invention to a pressure-sensitive member 122 which includes a diaphragm 124. This diaphragm may, for example, be operatively connected by a shaft 126 to a micro-switch member 128 or other control device.

In providing a stationary housing with an annular space and a rotor conduit communicating with the annular space, modifications may be desired. For example, in FIG. 14, I have shown a housing 4' secured to an outlet head 6' and having a rotor conduit 8' contained therewithin in suitable bearing members as 12' and 14' on a shaft 10'. In this arrangement, the housing 4' is formed with a fluid inlet 3' and this inlet extends radially inwardly and then axially to intersect an annularly recessed surface 32' at either side of which are sealing rings 38' and 40'. There is thus provided an annular space at one end of the housing 4' and an end face of the rotor body 8' may be held in sealing relationship with respect to the sealing rings 38' and 40'. Also formed in the end face of the rotor conduit 8' is a passageway 5' which sealably communicates with an outlet 7' by means of a sealing ring 50'. It will be apparent that rotation of the rotor 8' will provide for conducting compressed fluid introduced through the inlet 3' through any one of a series of outlets as 7' as the sealing ring 50' revolves through an orbital path of travel around the axis of shaft 10'.

It is also intended that either of the valve constructions now disclosed may have application in various fields of use, as for example, a sequencing means to operate a drilling machine whereby the first index might cause an air blast to clear chips from drill jig or fixture, the second index could actuate an air cylinder to cause a feed arm to place parts into jig or fixture, the third index could close fixture by means of air cylinder operated clamps, the fourth index could actuate a pneumatic operated drill head to perform the drilling operation, the fifth index could open fixture clamps, the sixth index could operate an air blast or mechanical device for eject action. The cycle thus completed may be repeated.

Various other machine tools such as common or turret lathes could also be operated by using this valve as a sequencing device, and uses of the valve as a sequencer is not limited to machine tools. It can be used to sequence any piece of machinery or equipment that can be operated by fluids sensitive activating devices.

I claim:

1. An improved valve construction comprising a stationary housing member having fluid inlet means, a fluid outlet head detachably mounted at one end of the housing and formed with a series of circumferentially spaced fluid outlet ports, fluid conducting rotor means rotatably contained between the outlet head and the housing in communication with the fluid inlet means, and a resilient sealing ring recessed in one side of the fluid conducting rotor means adjacent to the outlet head in a position to revolve in an orbital path of travel into successively sealed relationship around each of the circumferentially spaced outlet ports to periodically conduct fluid from the housing through the fluid outlet ports.

2. A structure according to claim 1 in which the fluid conducting rotor means includes a cylindrical body, a shaft element on which the cylindrical body is slidably received in keyed relationship, said shaft being located through the housing and having one end projecting outwardly therefrom, and means for engaging and moving the shaft and the cylindrical body through a desired arcuate path of travel.

3. A structure according to claim 2 in which the means for moving the shaft consists in a manually operated arm fixed to the outwardly projecting end of the shaft.

4. A structure according to claim 1 in which the fluid conducting rotor means includes a cylindrical body, a shaft element on which the cylindrical body is slidably received in keyed relationship, said shaft being located through the housing and having an end projecting outwardly therefrom, and means comprising a power-driven mechanism attached to the projecting end of the shaft for rotating the cylindrical body through a desired arcuate path of travel.

5. An improved valve construction comprising a cylindrical stationary housing member formed with a fluid inlet port and an annular fluid retaining chamber sealably connected thereto, a fluid outlet head detachably mounted at one end of the housing, said outlet head having a plurality of circumferentially spaced fluid outlet ports located therethrough, fluid conducting rotor means rotatably contained between the outlet head and the housing in communication with the annular fluid retaining chamber of the housing, said fluid conducting rotor means including a cylindrical part and a resilient sealing ring supported in an annular recess in one side of the cylindrical part, and means for revolving the cylindrical part and the resilient sealing ring in an orbital path of travel into successive sealing positions around each of the circumferentially spaced outlet ports.

6. A structure according to claim 5 in which the housing and fluid outlet head are formed with connecting passageways through which fluid may be discharged.

7. A structure according to claim 6 in which the connecting passageways include an annularly extending groove located in the cylindrical part adjacent to the revolving sealing ring, a discharge aperture formed in the outer periphery of the housing, and radially disposed slot means communicating with the annular groove and connecting with the discharge aperture.

8. A structure according to claim 5 in which the said cylindrical part is formed at an outer peripheral edge with a series of circumferentially spaced notches one of which is in radial alignment with the revolving sealing ring, and said inlet housing being provided with a detent element for successively engaging in the notches and guiding the sealing ring into positions of register with any one of the circumferentially spaced fluid outlets in the outlet head.

9. An improved rotary valve assembly characterized by a series of selectively operable fluid control passageways and being separable into three component parts for facilitating service and replacement of parts, said valve assembly comprising a stationary fluid inlet housing component, a fluid outlet component detachably secured at one side of the housing, and a fluid conducting rotor component contained between the housing and the outlet head and being slidably disengageable from the housing when the outlet head is detached, said housing and outlet head being formed with respective fluid inlet means and fluid outlet means and said fluid conducting rotor being rotatable into successive sealing positions for connecting outlet means in the outlet head with inlet means in the housing.

10. A structure according to claim 9 wherein said fluid conducting rotor has a resilient sealing ring recessed in one side thereof which rotates with said rotor and forms the sealing means between the outlet means in the outlet head with the inlet means in the housing.

* * * * *